United States Patent Office 3,795,654
Patented Mar. 5, 1974

3,795,654
DEGRADABLE POLYOLEFIN FILM
George Fred Kirkpatrick, Downers Grove, Ill., assignor to Union Carbide Corporation, New York, N.Y.
No Drawing. Filed Dec. 20, 1971, Ser. No. 210,152
Int. Cl. C08f 45/60; C08g 51/60
U.S. Cl. 260—45.9 NC         10 Claims

ABSTRACT OF THE DISCLOSURE

Degradable polyolefin film is disclosed. The film contains a material capable of advancing oxidative degradation of the polyolefin, and a water-soluble stabilizer. The stabilizer prevents degradation of the film during processing, normal storage, and use, but it is leached out of the film upon exposure to moisture, thereby permitting the film to degrade after use and disposal.

---

The invention relates to degradable polyolefin film containing a material capable of advancing oxidation of the film and a water-soluble stabilizer.

There is a need for plastic trash bags that will degrade after disposal. Several proposals have recently been made for providing degradable plastic. For instance, one proposal has been made to incorporate certain dyes in a plastic that act to degrade the plastic upon exposure to the ultraviolet rays of sunlight. Another proposal (in U.S. Pat. No. 3,454,510) is to incorporate certain organometallic compounds in polyolefin mulching film, which gradually cause deterioration of the film, at a controllable rate, upon exposure to sunlight. Another type of degradable polyolefin mulching film is disclosed in U.S. Pat. No. 3,320,695. In these films, degradation at a controllable rate upon exposure to outdoor weathering is provided by incorporating in the film unsaturated hydrocarbons and unsaturated resinous materials.

One feature that is shared by the foregoing and many other proposals for providing degradable plastic film is that the degradation requires ultraviolet light. In many cases, plastic trash bags are disposed of in landfill programs where they are buried almost immediately. Therefore, such trash bags would not be exposed to ultraviolet light for a long enough period of time to effect degradation. The present invention is directed to the provision of polyolefin film suitable for fabrication into trash bags, which is degradable without ultraviolet light.

Accordingly, it is an object of the invention to provide degradable polyolefin film.

It is another object of the invention to provide polyolefin film that is degradable after disposal, but which is stable during normal storage conditions.

A further object of the invention is to provide polyolefin film that will degrade without ultraviolet light.

Another object of the invention is to provide degradable plastic trash bags.

One more object of the invention is to provide polyolefin film that will degrade after exposure to moisture.

These and other objects and advantages of the invention are accomplished by the provision of polyolefin film, suitable for fabrication into trash bags by known methods, containing a material that advances oxidative breakdown of the polyolefin and a water soluble stabilizer. When trash bags fabricated from the polyolefin film of the invention are disposed of outdoors, even if buried, moisture leaches the stabilizer from the film, thereby permitting degradation of the film to occur.

Film grade polyolefin is employed to produce the degradable polyolefin film of the invention. The polyolefin can be either high or low density polyethylene, polypropylene, or polybutene. Film grade polyethylene, for example, usually has a Melt Index (by ASTM D-1238-57T) of from about 0.8 to about 3.0. The preferred polyolefins are polyethylene and polybutene-1, and polyethylene is more preferred.

One of the essential ingredients of the film is a material that advances oxidative degradation of the polyolefin. Such materials include oxides of metals that can exist in more than one valence state such as chromium, manganese, iron, and copper, wherein the metal is in a higher valence state. Such metal oxides are termed herein "oxidizing metal oxides." Specific examples of oxidizing metal oxides include chromic oxide, manganese dioxide, ferric oxide, and cupric oxide.

The polyolefin film of the invention also includes a water soluble stabilizer. Such water soluble stabilizers include lower alkyl (i.e., $C_1$ to $C_6$) substituted thioureas such as trimethyl thiourea, 1,3-diethyl thiourea, 1,3-dibutyl thiourea, ethylene thiourea, and mixed alkyl thioureas.

The oxidizing material is employed in the film in an amount sufficient to advance oxidative degradation of the film. The minimum amount of this material needed to effect this purpose has been found to vary from about 1 to about 5 weight percent, based on weight of polyolefin. Higher proportions of the oxidizing material can be used, if desired, but, since the material may be relatively expensive, higher proportions are not preferred.

The water soluble stabilizer is employed in a stabilizing amount, for instance, when the oxidizing material is used in amounts of 1 to 5 weight percent, proportions of the stabilizer of from about 0.02 to about 0.2 weight percent, based on weight of polyolefin, have been found to be useful. As a general rule, it is preferred to use the minimum amount of stabilizer necessary to achieve stabilization during processing and storage, so that relatively less contact with moisture will be required to leach out sufficient stabilizer to enable degradation to occur.

Other conventional additives such as lubricants, antiblocking agents, and pigments can be included in the polyolefin film in conventional amounts.

The oxidizing material and the water soluble stabilizer can be incorporated in the polyolefin film by conventional means such as by hot compounding by Banbury and roll mill, by extrusion compounding, or by dry tumbling with a masterbatch. The film can be extruded in the usual manner, and thereafter fabricated into trash bags by known methods, as by heat sealing one end of a length of extruded tubular film.

The examples below illustrate various aspects of the invention.

EXAMPLES 1–6

A series of polyethylene films, 1½ mils thick, were made by conventional extrusion procedures from a polyethylene having a density of 0.919 and a Melt Index of 1.3. The films contained conventional additives, and varying amounts of hydrated chromic oxide and other metal oxides, trimethyl thiourea, and ethylene thiourea. The complete compositions of these films, along with the control film containing a conventional stabilizer, are displayed in Table I.

TABLE I.—COMPOSITION OF FILMS

| Example number | Poly-ethylene | Hydrated chromic oxide | Mixed [1] metal oxides | Trimethyl thiourea | Ethylene thiourea | Eruca-mide | Steara-mide | Diato-maceous earth | Color [2] master-batch | Stabi-lizer [3] |
|---|---|---|---|---|---|---|---|---|---|---|
| 1 (Control) | 94.41 | | | | | 0.08 | 0.03 | 0.46 | 5 | 0.02 |
| 2 | 91.26 | 3 | | 0.10 | | 0.15 | 0.03 | 0.46 | 5 | |
| 3 | 90.91 | 3 | 0.4 | 0.10 | | 0.10 | 0.03 | 0.46 | 5 | |
| 4 | 91.31 | 3 | | | 0.10 | 0.10 | 0.03 | 0.46 | 5 | |
| 5 | 90.91 | 3 | 0.4 | | 0.10 | 0.10 | 0.03 | 0.46 | 5 | |
| 6 | 92.81 | 1.5 | | | 0.05 | 0.15 | 0.03 | 0.46 | 5 | |

[1] A mixture of manganese dioxide, chromic oxide, cupric oxide and ferric oxide.
[2] The composition of the color masterbatch was 15 weight percent rutile TiO$_2$, 34.5 percent chrome green, 2.4 percent chrome yellow, 3.88 percent carbon black, and 44.22 percent low density polyethylene (either the same polyethylene described above, or in some cases one having a density of 0.922 and a melt index of 1.75—results are similar in either case).
[3] 4,4'-thiobis(6-tert-butyl-meta-cresol).

The films were then evaluated for tensile strength, elongation, and tear strength, just after extruding, after one month at 140° F., after one month in water at room temperature, and after one month in water at room temperature followed by one month at 140° F. The results of these evaluations are displayed in Tables II and III.

TABLE II.—AGING TESTS ON FILM

| Example number | | Tensile strength, p.s.i. | | | | Elongation, percent | | | |
|---|---|---|---|---|---|---|---|---|---|
| | | 1 | 2 | 3 | 4 | 1 | 2 | 3 | 4 |
| 1 (Control) | MD | 3,173 | 3,097 | 2,815 | 2,640 | 393 | 361 | 316 | 297 |
| | TD | 2,922 | 2,804 | 2,806 | 2,870 | 514 | 510 | 522 | 400 |
| 2 | MD | 2,930 | 2,085 | 2,600 | 1,620 | 251 | 176 | 263 | 16 |
| | TD | 2,690 | 2,630 | 2,374 | 1,673 | 484 | 404 | 486 | 13 |
| 3 | MD | 2,859 | 2,730 | 2,452 | 1,573 | 176 | 136 | 166 | 10 |
| | TD | 2,158 | 2,335 | 1,894 | 1,442 | 413 | 409 | 455 | 6 |
| 4 | MD | 3,146 | 3,160 | 2,489 | 1,422 | 135 | 127 | 131 | 7 |
| | TD | 2,401 | 2,210 | 1,696 | 1,588 | 468 | 457 | 357 | 7 |
| 5 | MD | 3,051 | 2,710 | 2,641 | 1,670 | 164 | 137 | 170 | 14 |
| | TD | 2,290 | 2,145 | 2,139 | 1,783 | 455 | 385 | 458 | 9 |
| 6 | MD | 2,437 | 2,467 | 2,511 | 1,750 | 227 | 252 | 268 | 25 |
| | TD | 2,688 | 1,981 | 2,405 | 1,630 | 474 | 385 | 472 | 17 |

NOTE.—1=As extruded. 2=After one month at 140° F. 3=After one month in water. 4=After one month in water and one month at 140° F.

TABLE III.—AGING TESTS ON FILM

| Example number | | Tear strength, gms./mil | | | |
|---|---|---|---|---|---|
| | | 1 | 2 | 3 | 4 |
| 1 (control) | MD | 64 | 85 | 45 | 71 |
| | TD | 146 | 130 | 132 | 153 |
| 2 | MD | 67 | 87 | 52 | 5 |
| | TD | 129 | 130 | 133 | 9 |
| 3 | MD | 58 | 88 | 45 | 6 |
| | TD | 113 | 111 | 104 | 6 |
| 4 | MD | 186 | 163 | 78 | 5 |
| | TD | 121 | 112 | 88 | 4 |
| 5 | MD | 98 | 154 | 80 | 8 |
| | TD | 111 | 104 | 104 | 9 |
| 6 | MD | 68 | 61 | 45 | 15 |
| | TD | 134 | 122 | 118 | 14 |

NOTE.—1=As extruded. 2=After one month at 140° F. 3=After one month in water. 4=After one month in water and one month at 140° F.

In intepreting the results of these tests, it is noted that the films of the invention (i.e., films 2-6), as produced, in most cases had tensile strengths and tear strengths approximately the same as the control. Elongation of the films of the invention, as produced, appears to be somewhat less than the control. After one month of accelerated aging (i.e., one month at 140° F.), all of the films tested retained about the same proportion of their original properties. (The apparent significant increase in tear strength in the machine direction of film No. 5 may be anomalous.) After one month in water at room temperature, all of the films except for film No. 4 appear to have retained about the same proportion of their original properties. However, after one month in water at room temperature followed by accelerated aging for one month, the films of the invention all lost a considerable proportion of tensile strength and a larger proportion of elongation and tear strength. In contrast, the control film retained most of its tensile strength and elongation, and all of its tear strength.

The above-described experiments illustrate that the water-soluble stabilizer will be leached out of the film upon exposure to moisture, thereby permitting oxidative degradation of the film to occur.

What is claimed is:

1. Polyolefin film containing an oxidizing metal oxide in an amount sufficient to advance oxidative degradation of said polyolefin, and a stabilizing amount of a water soluble lower alkyl thiourea, such that upon exposure to moisture said lower alkyl thiourea can be leached out of said film in an amount sufficient to permit oxidative degradation of said polyolefin to occur.

2. The film of claim 1 wherein said oxidizing metal oxide is chromic oxide, manganese dioxide, cupric oxide, or ferric oxide.

3. The film of claim 1 wherein said polyolefin is polyethylene, polypropylene or polybutene.

4. The film of claim 1 wherein the oxidizing metal oxide is employed in said film in an amount of from about 1 to about 5 weight percent of the polyolefin and wherein said lower alkyl thiourea is employed in said film in an amount of from about 0.02 to about 0.2 weight percent of the polyolefin.

5. The film of claim 4 wherein said polyolefin is polyethylene or polybutene-1, and wherein said oxidizing metal oxide is chromic oxide, manganese dioxide, cupric oxide or ferric oxide.

6. The film of claim 4 wherein said lower alkyl thiourea is trimethyl thiourea, 1,3-diethyl thiourea, 1,3-dibutyl thiourea, ethylene thiourea, or a mixed lower alkyl thiourea.

7. The film of claim 5 wherein said polyolefin is polyethylene.

8. The film of claim 7 wherein said oxidizing metal oxide is chromic oxide.

9. The film of claim 6 wherein said lower alkyl thiourea is trimethyl thiourea or ethylene thiourea.

10. A degradable polyolefin bag fabricated from a polyolefin film containing an oxidizing metal oxide in an amount sufficient to advance oxidative degradation of said polyolefin, and a stabilizing amount of a water soluble lower alkyl thiourea, such that upon exposure to moisture said lower alkyl thiourea can be leached out of said film in an amount sufficient to permit oxidative degradation of said polyolefin to occur.

References Cited
UNITED STATES PATENTS

| 2,801,225 | 7/1957 | Harding | 260—45.95 R |
| 3,238,176 | 3/1966 | Brooks et al. | 260—45.9 NC |
| 3,133,897 | 5/1964 | Fujisawa | 260—45.9 NC |
| 3,211,692 | 10/1965 | Hopkins et al. | 260—45.9 NC |

DONALD E. CZAJA, Primary Examiner

W. E. PARKER, Assistant Examiner

U.S. Cl. X.R.

47—9; 150—1; 220—Dig. 30; 260—Dig. 43, 41 B, 45.95 R